(12) United States Patent
Bringer et al.

(10) Patent No.: US 8,130,265 B2
(45) Date of Patent: Mar. 6, 2012

(54) METHOD AND EQUIPMENT FOR THE IDENTIFICATION OF AN INDIVIDUAL BY OPTICAL CAPTURE OF A BODY IMPRINT IMAGE

(75) Inventors: Julien Bringer, Paris (FR); Hervé Chabanne, Paris (FR); Hervé Jarosz, Paris (FR)

(73) Assignee: Sagem Securite, Paris (FR)

( * ) Notice: Subject to any disclaimer, the term of this patent is extended or adjusted under 35 U.S.C. 154(b) by 394 days.

(21) Appl. No.: 12/530,947

(22) PCT Filed: Mar. 13, 2008

(86) PCT No.: PCT/FR2008/050430
§ 371 (c)(1),
(2), (4) Date: Sep. 11, 2009

(87) PCT Pub. No.: WO2008/129201
PCT Pub. Date: Oct. 30, 2008

(65) Prior Publication Data
US 2010/0110170 A1 May 6, 2010

(30) Foreign Application Priority Data

Mar. 14, 2007 (FR) ...................................... 07 01844

(51) Int. Cl.
*G06K 9/00* (2006.01)
*G06K 9/46* (2006.01)
(52) U.S. Cl. ........................... 348/77; 382/115; 382/124
(58) Field of Classification Search .................... 348/77, 348/161; 382/115, 124
See application file for complete search history.

(56) References Cited

U.S. PATENT DOCUMENTS 4,936,680 A * 6/1990 Henkes et al. .................. 356/71
(Continued)

FOREIGN PATENT DOCUMENTS

EP 1 187 055 A 3/2002
(Continued)

OTHER PUBLICATIONS

French Preliminary Search Report dated Nov. 12, 2007.
(Continued)

*Primary Examiner* — Larry Donaghue
(74) *Attorney, Agent, or Firm* — Miller, Matthias & Hull, LLP

(57) ABSTRACT

The invention relates to equipment for the identification of an individual by capture of body imprint images and of the underlying venous network, comprising: a prismatic optical element having: a large side for apposition of a body zone; a first inclined lateral side receiving a first radiation having a first wave length emitted by a first lighting means to light the large side with total reflection; a second inclined lateral side facing a first sensor receiving the first reflected radiation carrying an image of the body imprint; and a small side receiving a second radiation having a second wave length emitted by second lighting means, perpendicularly reaching the apposition zone and penetrating the body zone, and which faces a second sensor receiving the second reflected radiation carrying an image of the underlying venous network.

13 Claims, 5 Drawing Sheets

U.S. PATENT DOCUMENTS

| | | | | |
|---|---|---|---|---|
| 5,456,256 A | * | 10/1995 | Schneider et al. | 600/445 |
| 6,292,576 B1 | | 9/2001 | Brownlee | |
| 2003/0016345 A1 | | 1/2003 | Nagasaka et al. | |
| 2003/0020028 A1 | * | 1/2003 | Iihama et al. | 250/556 |
| 2004/0179723 A1 | | 9/2004 | Sano et al. | |
| 2005/0254695 A1 | * | 11/2005 | Nagasaka et al. | 382/126 |
| 2007/0014437 A1 | | 1/2007 | Sato | |

FOREIGN PATENT DOCUMENTS

| | | |
|---|---|---|
| WO | WO 2006 043252 A | 4/2006 |
| WO | WO 2006/093508 | 9/2006 |

OTHER PUBLICATIONS

European Examination Report dated Mar. 11, 2010.

* cited by examiner

METHOD AND EQUIPMENT FOR THE IDENTIFICATION OF AN INDIVIDUAL BY OPTICAL CAPTURE OF A BODY IMPRINT IMAGE

CROSS-REFERENCE TO RELATED APPLICATIONS

This application is a U.S. national stage filing of International Patent Application No. PCT/FR2008/050430 filed on Mar. 13, 2008, which claims priority under the Paris Convention to French Patent Application No. 07 01844, filed on Mar. 14, 2007.

FIELD OF THE DISCLOSURE

This invention relates in general to the field of identification of an individual by optical capture of a body imprint image, in particular a fingerprint, in a region of the individual's body, to processing this image in order to obtain data extracted from this body imprint image, and to processing the data extracted from the captured image of the body imprint with a view to identifying the individual.

BACKGROUND OF THE DISCLOSURE

The identification of an individual by means of the record of a body imprint taken from a region of the body thereof, and in particular most commonly by means of a fingerprint taken from the distal phalanx of one of the fingers thereof is confronted with numerous difficulties.

When capturing the body imprint, one problem consists in protecting against fraud committed by the fake body imprint technique, and in particular the so-called "model finger" technique, most frequently in the case of capturing a fingerprint. Solutions are known which enable fraud of this type to be detected (see, for example, documents FR 2 881 856 and FR 06 09629 by the applicant).

When capturing the body imprint, another problem lies in the positional deviation between the region of the body bearing the body imprint and the position taken as the reference position, which was adopted during a previous registration capture (also called the enrollment step), which provided an image held in memory. Technical solutions are known for identifying the individual, which enable comparison of the captured image of the body imprint with the stored image of the body imprint, these two images not being strictly coincident. However, such processing of the data is very complex and long.

Admittedly, in order to solve this problem, the presence of one or more reference marks could be anticipated on the region of the body from which the imprint is to be taken. In this way, provisions could be made for marking said region of the body with one or more visible or invisible marks, e.g., such as two lines in predetermined mutual positions (e.g., parallel positions). However, it is not foreseeable, for example, to mark the body by making incisions in order to obtain unalterable marks, and one would have to make do with a marking in indelible ink, for example: the disadvantage of this solution lies in the limited lifetime of these marks and the application thereof would be of a small scale. It could likewise be anticipated to detect a small number of characteristic points present in the region of the body (e.g., minutiae and deltas of a fingerprint). However, such reference marks are too imprecise and furthermore would require overly complex and lengthy processing of the data in order to utilize same.

Yet another problem occurs when it is a matter of identifying an individual by comparing the captured image of the body imprint taken from a region of the body of same with the stored images of body imprints from a collection containing a large number of stored body imprint images. This selection process is long, due to the large number of data items to be processed. It is known to accelerate the process by implementing another identification criteria making it possible to carry out a faster preselection of a limited number of stored body imprint images from among which the comparison with the captured body imprint image is finally carried out (see, for example, the document FR 2 810 226 by the applicant).

It is understood from the preceding that technical arrangements are known, which enable the aforementioned problems to be resolved. However, the disadvantages of these currently known solutions lies in the fact that they are suitable for dealing separately with a specific problem, and that dealing with all of the stated problems concomitantly involves parallel implementation of the various respective individual solutions. This alternative is not satisfactory, in particular due to the multiplication of the means to be implemented, and to the additional cost and possible loss of processing time (or insufficient gain in processing time) resulting therefrom.

Moreover, the solutions known to date for dealing with the respective stated problems are admittedly worthy of existence and of providing satisfaction from a technical standpoint, as far as the results obtained are concerned, but they do not optimally meet the requirements of data processing speed and cost (implementation of a minimum number of means).

In order to attempt to remedy the aforementioned disadvantages, it is known to make further use of a capture of the underlying venous network in said region of the individual's body. From the document WO 2006/043252, in particular, a system is known for identifying an individual by recording a body imprint, in particular a fingerprint, from a region of the body of same, this system comprising means of optically capturing an image of a body imprint, in particular a fingerprint, from said region of the individual's body, means of optically capturing an image of at least a portion of the venous network in said region of the individual's body and underlying said body imprint, said system comprising two lighting means capable of emitting two light beams, respectively, containing two light radiations having two separate wavelengths, respectively, and sensing means capable of capturing the two images in connection with the respective wavelengths.

However, this document does not provide any information relating to the structure of such a system, while, in actual practice, systems are required which are as simple and compact as possible and the cost of which is as low as possible.

Furthermore, the aforesaid known system carries out a dual biometric control with both the capturing of the body imprint and with the capturing of the underlying venous network. Such being the case, one difficulty which arises when capturing a body imprint is that, when capturing with a view to identifying the individual, the body region (e.g., the end of a finger) is not in exactly the same position as during the initial enrollment capture for the individual. Therefore, it is necessary to reposition the captured image in relation to the stored image. The document WO 2006/043252 does not state this problem and consequently does not propose any solution.

SUMMARY OF THE DISCLOSURE

Therefore, the object of the invention is to meet these needs of actual practice and to propose a solution which provide satisfaction in resolving the aforementioned problems, so as to reduce the costs of means implemented, to simplify the matching up of the captured image and the stored image, and, therefore, at least to a certain extent, to accelerate processing of the data.

For these purposes, the invention, according to one of the aspects thereof, proposes a system for identifying an individual by recording a body imprint, in particular a fingerprint, in a region of the body of same, this system comprising means of optically capturing an image of a body imprint, in particular a fingerprint, from said region of the individual's body, means of optically capturing an image of at least a portion of the venous network in said region of the individual's body and underlying said body imprint, said system comprising two lighting means capable of emitting two light beams, respectively, containing two light radiations having two separate wavelengths, respectively, and sensing means capable of capturing the two images in connection with the respective wavelengths, which system, being arranged in accordance with the invention, is characterized in that it comprises:

a prismatic optical element having a large face at least a portion of which consists of a region for apposition of a body region of an individual, first lighting means capable of emitting a first light radiation having a first wavelength and being arranged opposite a first inclined lateral face of said prismatic optical element, such that the first radiation emitted by said first lighting means passes through the prismatic optical element in order to arrive at said apposition region at an angle of incidence capable of total reflection, a first sensor sensitive to said first radiation being arranged opposite a second inclined lateral face of said prismatic optical element opposite said first inclined lateral face, so as to receive the first radiation reflected by the large face of the prismatic optical element and carrying an image of the body imprint when a region of an individual's body is applied to said apposition region, second lighting means capable of emitting a second light radiation having a second wavelength being arranged opposite a small face of the prismatic optical element such that the second radiation emitted by said second lighting means passes through the prismatic optical element in order to arrive at said apposition region, which is substantially perpendicular thereto and capable of penetrating into the region of the body when a region of an individual's body is applied to said apposition region, and said second sensor sensitive to said second radiation being arranged opposite said small face of the prismatic optical element so as to receive the second reflected radiation carrying an image of at least a portion of the underlying venous network, when a region of an individual's body is applied to said apposition region.

A system in accordance with the invention is of simple design and can be made compactly, whereby it is capable of meeting the expectations of actual practice in terms of less bulkiness and ease of installation as well as that of least cost.

It is therefore advantageous for the prismatic optical element to be elongate such that the first light radiation undergoes multiple reflections prior to arriving at said second inclined lateral face.

Preferably, in order to reduce the duration of the dual capture operation, provisions are made for the means of optically capturing an image of said body imprint in a region of the individual's body and the means of optically capturing an image of at least a portion of the venous network in the region of the individual's body to be controlled simultaneously.

The invention is based on the known fact that certain types of electromagnetic radiation (particularly near-infrared) passes through the tissues, but are reflected by hemoglobin. By implementing lighting which is suitable both by reason of the wavelength and the incidence thereof, it is therefore possible to record a mapping of the subcutaneous venous network in a predetermined region of an individual's body. However, in actual practice, within the scope of the invention, a complete, or at the very least significant record of the subcutaneous venous network is useless: it suffices to identify a few characteristic points of the venous network so as to generate a reference marking system defining a line, or preferably two not necessarily substantially parallel reference marking lines, which is capable of enabling a resetting of the position of the body region subjected to the body imprint capture process in relation to the position of this same body region during the enrollment step.

It is likewise emphasized that, within the context of this invention, the mapping of the venous network is not utilized as a fundamental criterion for identifying the individual in the same capacity as the image of the body imprint and in parallel with same. Therefore, within the context of the invention, it is not a matter of making an identification based on two criteria treated in parallel. The mapping of the venous network is simply utilized as an auxiliary operational criterion capable of facilitating processing of the body imprint image, which remains the single identification criterion.

In one practical exemplary embodiment, one wavelength is situated in the red (of the order of 650 nm) for capturing the body imprint image, and the other wavelength is situated in the near-infrared (of the order of 950 nm) for capturing the venous network.

A first exemplary embodiment of the above-disclosed system is characterized in that it comprises:

storage means in which at least one data pair is stored in memory, which consists of stored data extracted from the body imprint image of the region of the individual's body and of stored data extracted from the image of the venous network of the region of the individual's body, which data is captured during a preliminary registration (or enrollment) step, while the body region occupies a position which is taken as a reference position, first comparator means capable of comparing data extracted from the captured image of the venous network of the region of the individual's body, which was captured and stored during a later step for identifying an individual, with the stored data from said venous network, and of deducing therefrom the actual position of the body region in relation to the previously defined reference position, and second comparator means capable of comparing data extracted from the captured image of the body imprint of the region of the individual's body, which was captured and stored during said later step for identifying the individual, with the data extracted from the stored image of the body imprint, said second comparator means being placed under the dependency of said first comparator means, in order to take account of the position of the body region in relation to the reference position thereof.

A second exemplary embodiment of the above-disclosed system is characterized in that it comprises:

storage means in which data pairs are stored in memory, which consist of stored data extracted from a body imprint image of the region of the individual's body and of stored data extracted from an image of the venous network of the region of the body of each individual of a group of individuals, which data is captured and stored during a preliminary registration (or enrollment) step, while, for each individual, the body region occupies a position which is taken as a reference position, third comparator means, which, during a later step for identifying an individual, are capable of comparing data extracted from the captured image of the venous network of the body region of an individual, which was captured during a later step for identifying the individual, with the data extracted from the stored images of venous networks of the group of individuals, and of identifying which stored data of venous network images of the group of individuals is identical with the captured data of individual's venous network image, first comparator means, which, during said later step for identifying an individual, are capable of comparing the captured data of the individual's venous network image with each of said identified stored data of venous network images of the group of individuals, and, in each case, of deducing therefrom the actual position of the body region in relation to the previously determined reference position, and second comparator means, which, during said later step for identifying an individual, are capable of comparing the captured data extracted from the individual's body imprint with each of the stored data items of body imprints associated with said identified stored data of venous network images of the group of individuals, respectively, said second comparator means being placed under the dependency of said first comparator means in order to take account, in each case, of the position of the body region in relation to the reference position.

A third exemplary embodiment of the above-disclosed system is characterized in that it comprises:

storage means in which at least one data pair is stored in memory, which consists of stored data extracted from the body imprint image of the region of the individual's body and of stored data extracted from the image of the venous network of the region of the individual's body, which data is captured during a preliminary registration (or enrollment) step, while the body region occupies a position which is taken as a reference position, comparator means capable of comparing data extracted from the captured image of the venous network of the region of the individual's body, which was captured during a later step for identifying an individual, with the stored data from said venous network, and of deducing therefrom the actual position of the body region in relation to the previously defined reference position, and correcting means placed under the dependency of said comparator means and capable of correcting data extracted from the captured image of the body imprint of the region of the individual's body, which was captured during said later step, while taking account of the actual position of the body region in relation to the reference position thereof.

The invention, according to a second one of the aspects thereof, proposes a method of identifying an individual which is capable of being implemented by the first aforesaid exemplary embodiment of the system in accordance with the invention, which method includes the steps consisting in:

optically capturing an image of a body imprint, in particular a fingerprint, from a region of the individual's body, optically capturing, in parallel, an image of at least a portion of the venous network from said region of the individual's body and underlying said body imprint, processing said body imprint image in order to obtain data extracted from this body imprint image, and processing the data extracted from the captured image of the body imprint with the aid of the data extracted from the captured image of the venous network, with a view to identifying the individual, characterized in that, during a preliminary registration (enrollment) step of an individual, a data pair, consisting of stored data extracted from the body imprint image and stored data extracted from the venous network image, is captured from a region of the body of each individual and stored in memory, the body region occupying a position which is taken as a reference position, and then, in that, subsequently and during a a step of identifying the individual, a body imprint image and a venous network image are captured from the region of individual's body, data extracted from the captured image of the venous network is first compared with the stored data from said venous network, the actual position of the body region is deduced therefrom, in relation to the previously determined reference position, and data extracted from the captured image of the body imprint is compared with the stored data from the body imprint, while taking account of the position of the body region in relation to the reference position thereof.

The invention likewise proposes a method of identifying an individual which is capable of being implemented by the aforesaid second exemplary embodiment of the system in accordance with the invention, which method includes the steps consisting in:

optically capturing an image of a body imprint, in particular a fingerprint, from a region of the individual's body, optically capturing, in parallel, an image of at least a portion of the venous network from said region of the individual's body and underlying said body imprint, processing said body imprint image in order to obtain data extracted from this body imprint image, and processing the data extracted from the captured image of the body imprint with the aid of the data extracted from the captured image of the venous network, with a view to identifying the individual, characterized in that, during a preliminary registration (enrollment) step for a group of individuals, a data pair, consisting of stored data extracted from the body imprint image and stored data extracted from the venous network image, is captured from a body region of each individual and stored in memory, and then, in that, subsequently and during a step of identifying an individual, data extracted from the body imprint image and data extracted from the venous network image is captured from the region of the individual's body, the data captured from the venous network of the individual is compared with the stored data from venous networks of the individuals of the group of individuals, the stored venous network data which is identical to said captured venous network data is selected, and for the stored body imprint data which is paired with said stored venous network data that was selected, the captured venous network data is compared with the selected stored data of said venous network, and the actual position of the body region is deduced therefrom in relation to the previously determined reference position, and the captured body imprint data is compared with the stored body imprint data associated with the selected stored data of said venous network, while taking account of the position of the body region in relation to the reference position thereof.

The invention further proposes another method of identifying an individual, which is capable of being implemented by the third aforesaid exemplary embodiment of the system in accordance with the invention, which method includes the steps consisting in:

optically capturing an image of a body imprint, in particular a fingerprint, from a region of the individual's body, optically capturing, in parallel, an image of at least a portion of the venous network from said region of the individual's body and underlying said body imprint, processing said body imprint image in order to obtain data extracted from this body imprint image, and processing the data extracted from the captured image of the body imprint with the aid of the data extracted from the captured image of the venous network, with a view to identifying the individual, characterized in that, during a preliminary registration (enrollment) step of an individual, a data pair, consisting of stored data extracted from the body imprint image and stored data extracted from the venous network image, is captured from a body region of each individual and stored in memory, the body region occupying a position which is taken as a reference position, and then, in that, subsequently and during a step of recording the body imprint of the individual, a body imprint image and a venous network image are captured from the region of individual's body, data extracted from the captured image of the venous network is compared with the stored data from said venous network, the actual position of the body region is deduced therefrom, in relation to the previously determined reference position, and data extracted from the captured body imprint image is repositioned, while taking account of the actual position of the body region in relation to the reference position thereof.

In a preferred implementation of one of the three methods above, the body imprint image and the venous network image are captured simultaneously, so as to reduce the duration of the dual capture to a minimum.

From a practical standpoint, the body region is illuminated with two light radiations having two separate wavelengths, and the two images are captured in connection with the respective wavelengths; from a practical standpoint, to capture the body imprint image, the body region is illuminated with radiation having a wavelength situated in the red (typically of the order of 650 nm) and, to capture the venous network, the body region is illuminated with radiation having a wavelength situated in the near-infrared (typically of the order of 950 nm).

BRIEF DESCRIPTION OF THE DRAWINGS

The invention will be better understood upon reading the following detailed description of certain preferred implementations and embodiments given for non-limiting and illustrative purposes only. In this description, reference is made to the appended drawings, in which.

DETAILED DESCRIPTION OF THE DISCLOSURE

Figure 1A:
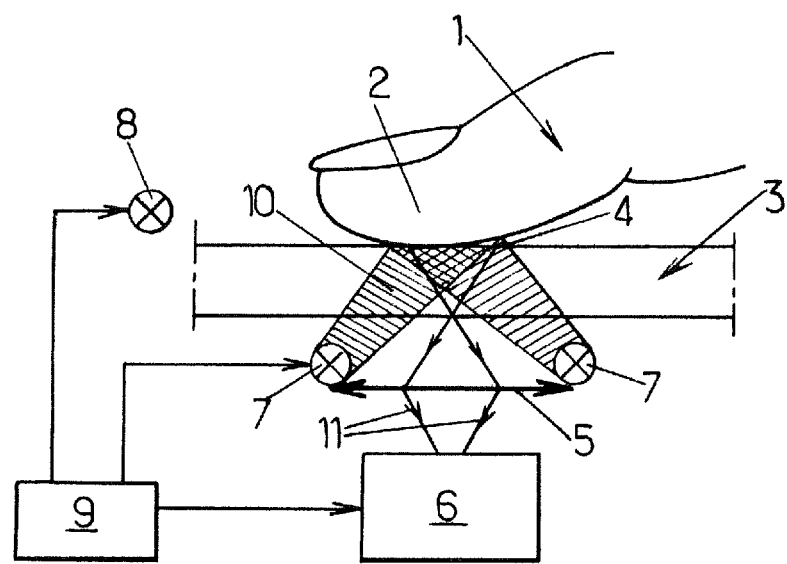
FIGS. 1A an 1B are very schematic views of a first possible embodiment of a portion of a system for identifying an individual by recording a body imprint of a body region thereof, in particular a fingerprint, which is shown in two different functional situations, respectively.
Figure 1B:
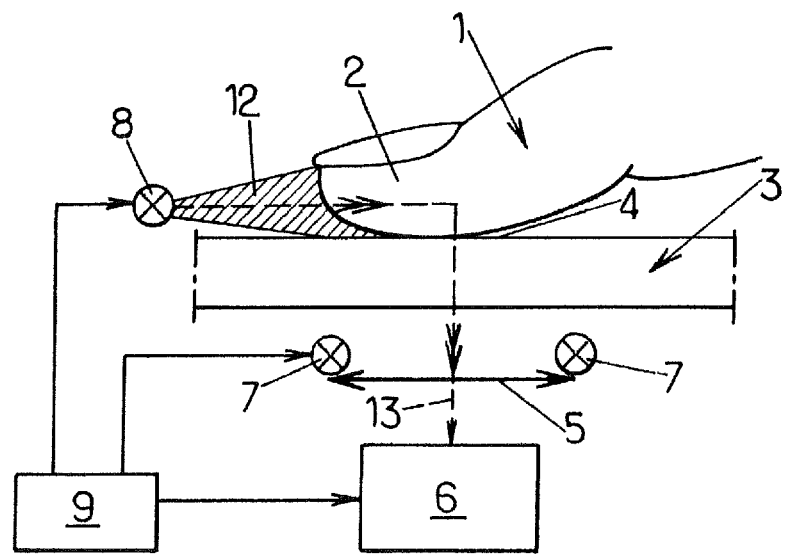

A portion of a system suitable for identifying an individual by recording a body imprint of a body region thereof, in particular a fingerprint, is shown very schematically in FIGS. 1A and 1B. This portion can be considered as comprising a device for obtaining a body imprint image of a region 1 of an individual's body, in this case a fingerprint of the first phalanx 2 of a finger of one of the hands of same.

The device conventionally comprises means of optically capturing an image of said body imprint taken from a region of the individual's body. Since, in actuality, it is a matter of capturing a fingerprint, the body region is, for example, the first phalanx 2 of a finger of a hand.

The device likewise comprises means of optically capturing an image of at least a portion of the venous network in the same region of the individual's body.

As shown in FIGS. 1A and 1B, the device comprises a plate 3 which is at least partially transparent to the electromagnetic radiation used (typically made of glass or the like) so as to comprise a region 4 for apposition of the region 1 of the individual's body (in this case, the proximal phalanx of a finger of a hand) on which the body imprint is to be captured.

A focusing lens 5 and sensing means 6 capable of detecting two electromagnetic radiations having separate wavelengths are arranged beneath the plate 3, whether the sensors used are sensitive to these two wavelengths, or whether a dual array of sensors is provided, which are sensitive to both wavelengths, respectively.

First lighting means 7 (e.g., in the form of LED diodes) are placed around the lens 5 and arranged so as to more or less illuminate the front of the region 1 of the body placed in contact with the apposition region 4 of the plate 3. The first lighting means 7 emit a first light beam 10 comprising radiation having a first wavelength, typically in the red, e.g., with a wavelength of the order of 650 nm. The reflected radiation 11 carrying the optical information for the body imprint is shown as a solid line.

Second lighting means 8 (e.g., in the form of LED diodes) are arranged so as to laterally illuminate the region 1 of the body applied to the apposition region 4 of the plate 3. The second lighting means 8 emit a second light beam 12 comprising radiation having a second wavelength such that the radiation is capable of passing through the tissues, but is reflected by hemoglobin, in other words by the venous network. This wavelength is typically situated in the near-infrared and is, for example, of the order of 950 nm. The reflected radiation 13 carrying the optical information for the venous network is shown by dashed lines.

Control means (microcontroller) 9 drive the sensing means 6 and the lighting means 7, 8 so that two successive steps are carried out, one with the first lighting means 7 (FIG. 1A) and the second with the second lighting means 9 (FIG. 1B), in order to successively capture the two required images (image of the body imprint and image of the subcutaneous venous network). These two steps must be sufficiently brief (e.g., not exceeding 1 second) so that, on the one hand, the individual can without difficulty keep the body region 1 on which the dual capture is being carried out immobilized on the plate 3, and so that, on the other hand, a fraudulent substitution cannot be made between the two captures.

Figure 2:
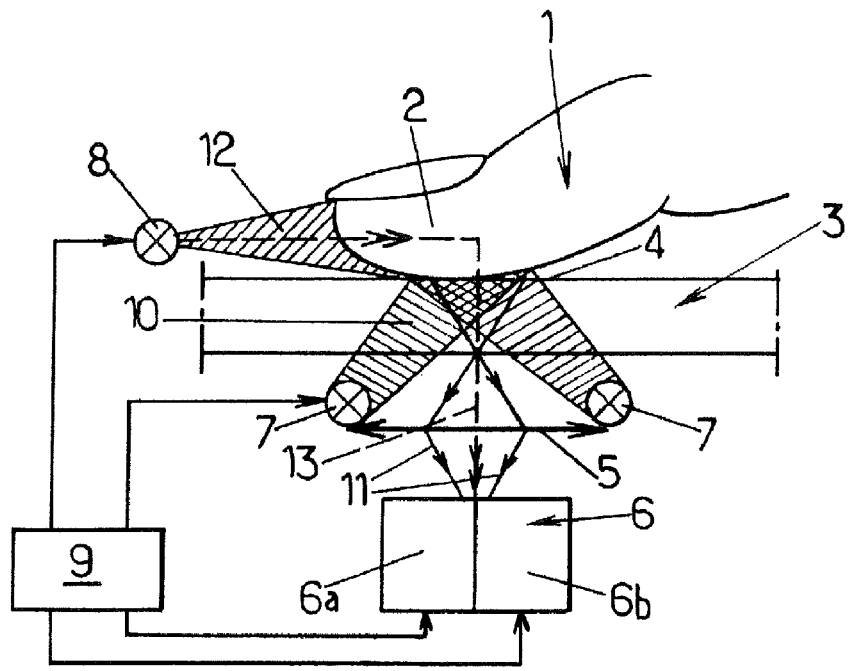
FIG. 2 is a very schematic view of an alternative of the first embodiment of FIGS. 1A and 1B.

FIG. 2 more particularly shows a specific configuration of the arrangement of FIGS. 1A and 1B, wherein the sensing means 6 consist of a dual array of sensors sensitive to the two radiations having different wavelengths, respectively. In FIG. 2, for the sake of simplifying the representation, this configuration is diagrammed in the form of a block 6, which is formed by the juxtaposition of two sub-blocks 6a, 6b corresponding to the two types of sensors, respectively, it being understood that, in actual practice, this is an array consisting of pairs of sensors of both types, respectively. It can then be anticipated for the control means 9 to trigger the lighting means 7 and 8 simultaneously, whereby the two captures of the two images of the body imprint and subcutaneous venous network, respectively, occur simultaneously; the individual sensors of the sensing means 6 selectively process the radiation to which they are sensitive: e.g., the first sensors 6a process the first radiation having the first wavelength, whereas the second sensors 6b process the second radiation having the second wavelength.

Figure 3:
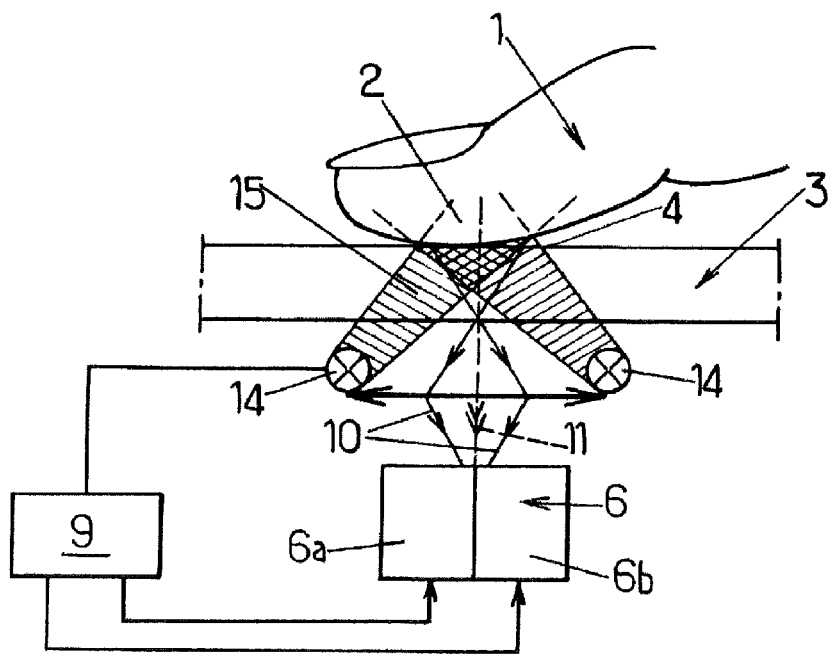
FIG. 3 is a very schematic view of an alternative of the arrangement of FIG. 2.

An alternative embodiment of the arrangements disclosed above with regard to FIG. 2 is shown schematically in FIG. 3. This alternative embodiment no longer makes use of physically separate first and second lighting means 7 and 8 in order to emit the aforesaid radiations, but of single lighting means 14 which are capable of emitting a single beam 15 including both required wavelengths. For example, this may involve a light source emitting radiation covering a predetermined range of wavelengths with which filtering means are associated, which are capable of isolating two radiations having both required wavelengths, respectively; this may also involve, for example, a light source (e.g., in the form of LED diodes) capable of emitting a dual light radiation set to two predetermined wavelengths. The operation remains identical to that described above, the most suitable mode of operation consisting in carrying out simultaneous captures by jointly implementing two types of sensors 6a, 6b, which are sensitive to the two wavelengths, respectively.

Figure 4:
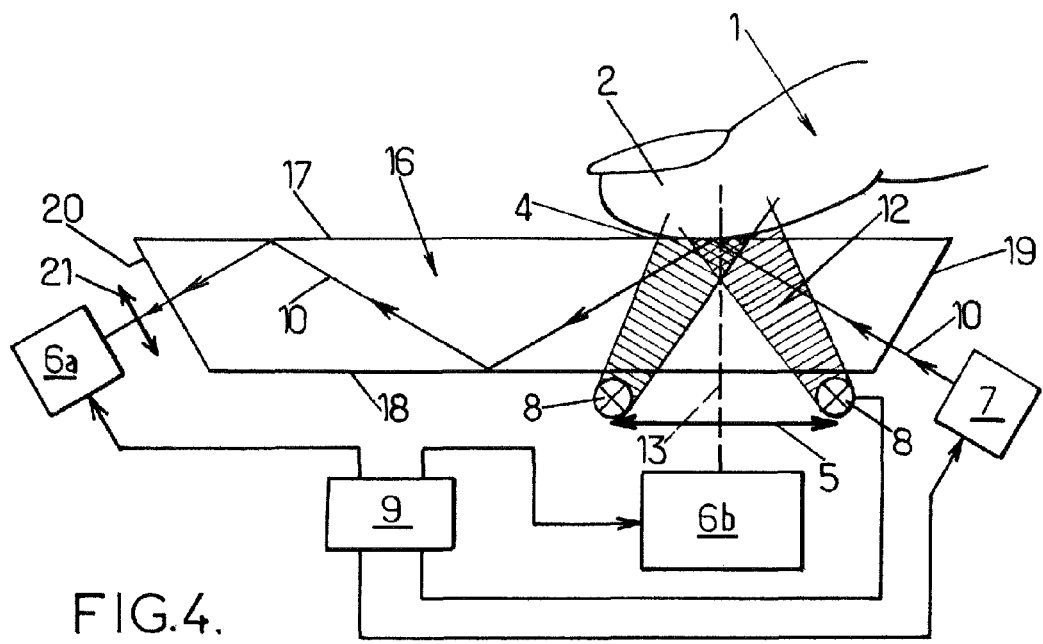
FIG. 4 is a very schematic view of a preferred embodiment of a portion of a system for identifying an individual by recording a body imprint of a body region thereof, in particular a fingerprint, which is designed in accordance with the invention.

With regard to FIG. 4, an actual system in accordance with the invention will now be described, which makes use of two separate lighting sources for the two required wavelengths, respectively. In FIG. 4, the same numerical references as in FIGS. 1A, 1B and 2 will be used to designate identical or similar elements or parts.

The arrangement shown in FIG. 4 implements a prismatic optical element 16 (hereinafter called the prism), which is in the form of a transparent plate, e.g., made of glass, having two principal faces, an upper principal face 17 and a lower face 18, respectively. The two faces 17, 18 are advantageously parallel so as to simplify the operation of the device. In addition, the prism 16 comprises two end faces 19, 20, respectively, which are inclined and turned downwardly (in the drawing), whereby the upper principal face 17 is larger than the lower principal face 18. Thus, as a whole, the prism 16 has a trapezoidal cross section. The upper principal face 17 consists at least partially of said apposition region 4 for the region 1 of the individual's body on which the body imprint is to be captured, which, in this case, is a finger.

The first lighting means 7, which emit a first radiation 10 having a first wavelength typically of the order of 650 nm (red), are arranged opposite the inclined face 19 close to the apposition region 4 for the body region 1. The radiation 10 is directed substantially perpendicular to the inclined face 19 (inclined face of entry) of the prismatic optical element 16, whereby it does not undergo any appreciable deviation when penetrating into the prismatic optical element 16. The radiation 10 arrives at the principal upper face 17 at an angle of incidence capable of resulting in the total reflection thereof at the locations where portions of the body region 1 (ridges of the body imprint) are in physical contact with the apposition region 4. whereas, at the locations where no portion of the body region 1 is in physical contact with the apposition region 4 (furrows in the body imprint), the radiation does not undergo any reflection. Inside the prismatic optical element 16, the light radiation 10 carrying the information about the body imprint image undergoes multiple total reflections until arriving substantially perpendicular to the inclined face 20 (inclined face of exit) of the prismatic optical element 16. Upon exiting the prismatic optical element 16 by way of a focusing optic 21, the light beam 10 arrives at the sensing means 6a suitable for detecting the first radiation having the first wavelength and which picks up the image of the body imprint (the ridges of the body imprint being light, whereas the furrows of the body imprint are dark).

Second lighting means 8, which emit a second radiation 12 having a second wavelength, typically of the order of 950 nm (near-infrared), are arranged opposite the lower principal face 18 and substantially plumb over the apposition region 4. The radiation 12 passes through the prismatic optical element 16 and penetrates into the body region 1 inside of which it undergoes a reflection on the hemoglobin-filled portions (in actual practice on the veins). The reflected radiation 13 (in dashed lines in FIG. 4) is directed substantially perpendicular to the principal faces 17, 18 of the prismatic optical element 16 and, by way of the focusing optic 5, arrives at the sensing means 6b suitable for detecting the second radiation having the second wavelength and which picks up the image of the venous network underlying the body imprint.

The captures of both images can preferably be simultaneous and the control means (microcontroller) 9 ensures appropriate triggering of the lighting means and synchronization of the sensing means.

It is emphasized here that implementation of the invention does not require complete knowledge of the entire venous network, and that knowledge about only a small number of points of the venous network may suffice for creating the reference system required for processing the body imprint image detected by the first sensing means. Consequently, within the context of the invention, the expression "image of the venous network" should be understood as designating an image incorporating a few points or portions of the venous network, which are sufficient in number and relative positions for creating a reference system capable in particular of determining the orientation of the body region (in order to correct a positioning misalignment) and scaling (in order to account for the crushing of the body region applied against the apposition region).

In the same way, the process of identifying the individual by capturing a body imprint thereof does not require complete knowledge of the entire body imprint, and knowledge of a certain number of characteristic points of the body imprint may suffice to ensure this identification.

Therefore, for practical implementation of the invention, only data extracted from the body imprint image and data extracted from the venous network image are used, both of which have been captured on the individual.

As already specified above, it remains established that the data extracted from the captured image of the venous network is intended substantially to aid in the processing of the data extracted from the capture image of the body imprint.

Figure 5:
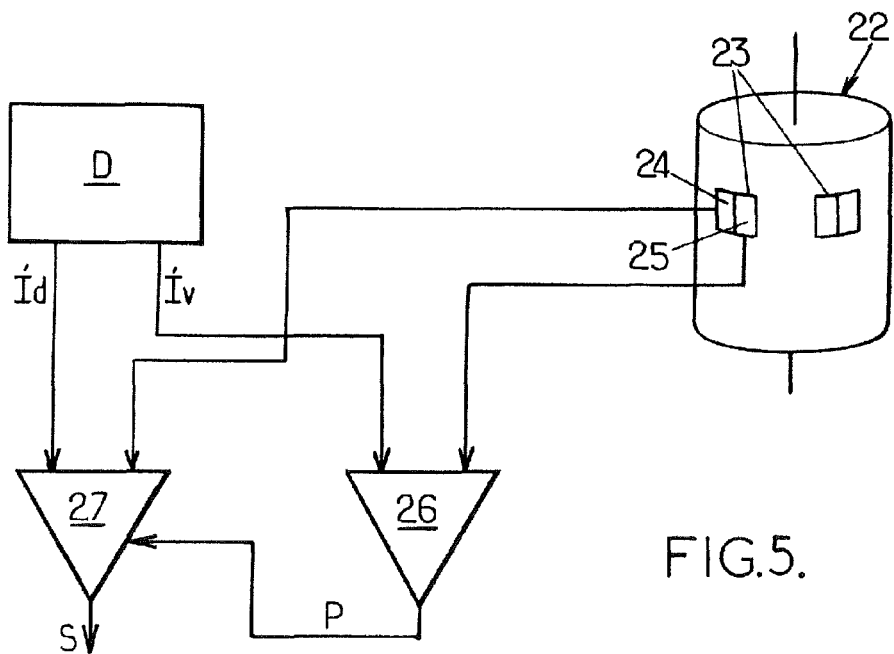
FIG. 5 is a very schematic view of a first exemplary embodiment of a system for identifying an individual by recording a body imprint of a body region thereof, in particular a fingerprint, which implements the arrangement of FIG. 4 in accordance with the invention.
Figure 6:
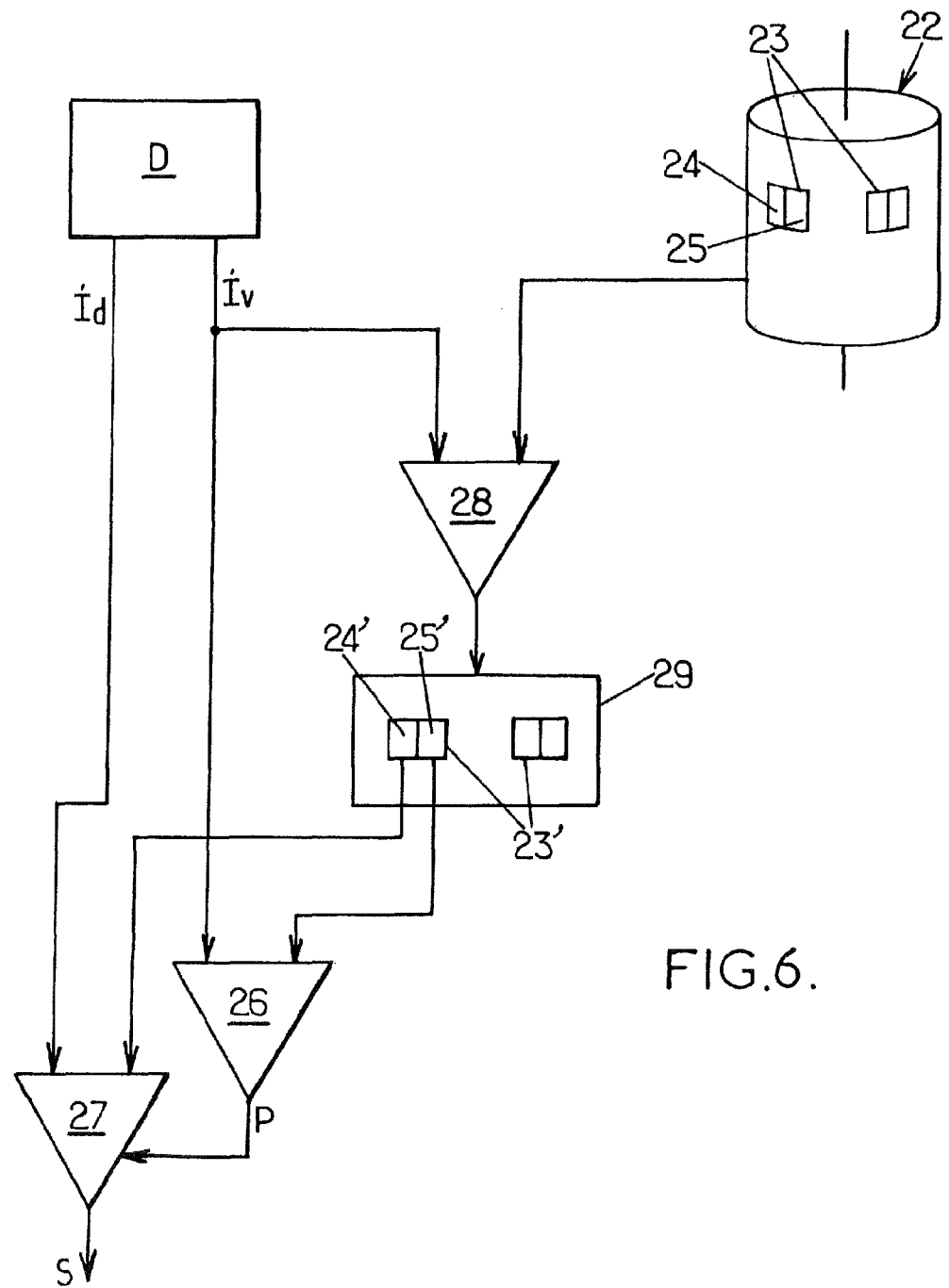
FIG. 6 is a very schematic view of a second exemplary embodiment of a system for identifying an individual by recording a body imprint of a body region thereof, in particular a fingerprint, which implements the arrangement of FIG. 4 in accordance with the invention.
Figure 7:
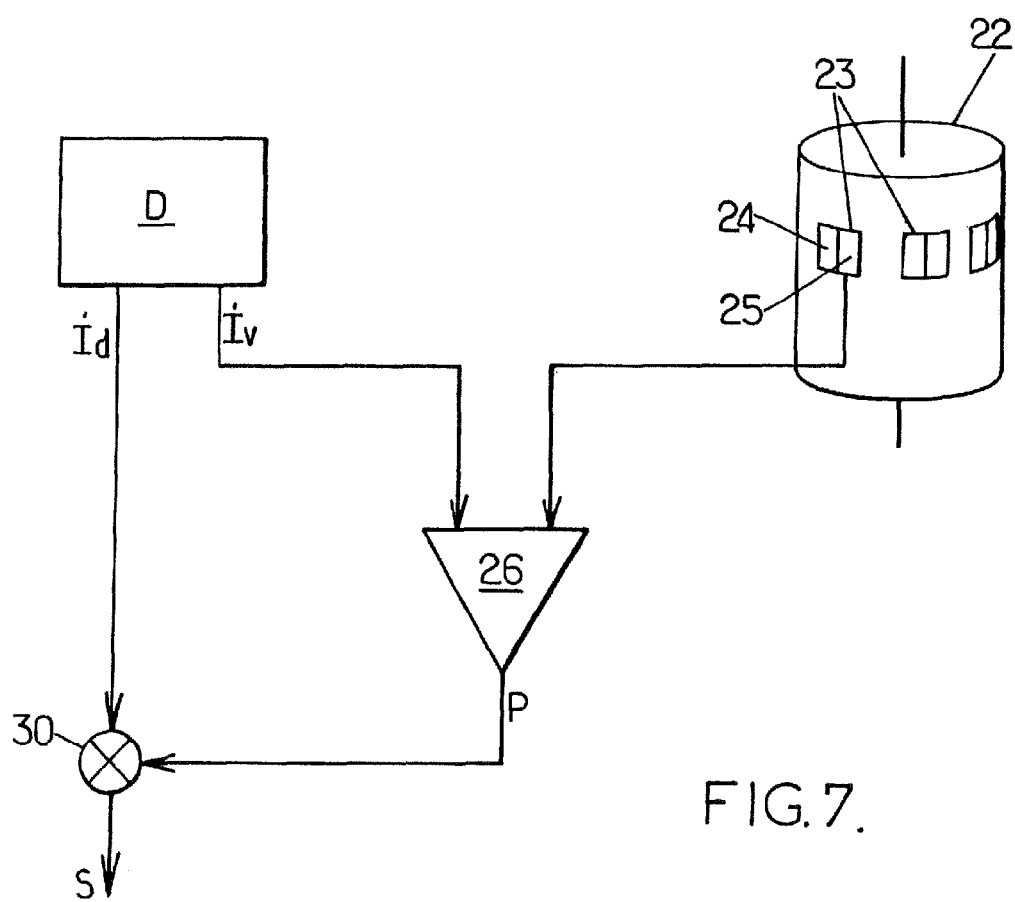
FIG. 7 is a very schematic view of an exemplary embodiment of a system for recording a body imprint of a body region, in particular a fingerprint, which implements the arrangement of FIG. 4 in accordance with the invention and which is capable of being used, in particular, but not exclusively, for identifying an individual.

Practical exemplary implementations of the system in accordance with the invention just described will now be provided in relation to FIGS. 5 to 7, respectively.

FIG. 5 is a schematic representation, in the form of a block diagram, of a first exemplary arrangement of a system for identifying an individual by recording a body imprint of a body region thereof, in particular a fingerprint. This system comprises storage means 22 in which data pairs 23 are held in memory, each of which consists of stored data 24 extracted from the body imprint image of the region of the individual's body and stored data 25 extracted from the venous network image of the region of the individual's body; these data pairs are captured and stored in memory during a preliminary registration (enrollment) step of an individual, by using a device in accordance with the invention, as described previously, the body region then occupying a position which is taken as a reference position.

In order to enable identification of the individual during a subsequent procedure, the system comprises a device for capturing a body imprint image of the region of the individual's body and a venous network image of the region of the individual's body, said device, which is designated by the reference sign D, designed in accordance with the invention, as described previously.

First comparator means 26 are provided in the system:
for receiving data Iv extracted from the captured image of the venous network, which is delivered by the device D, and the stored data 25 from said venous network, which is held in memory in the storage means 22,
for comparing said data Iv extracted from the captured image of the venous network with said stored data 25 from said venous network, and
for deducing therefrom the actual position (during apposition of the body region 1 on the apposition region 4) of the body region in relation to the previously determined and stored reference position (output signal P).

Finally, second comparator means 27 are provided in the system:
for receiving data Id extracted from the captured image of the body imprint, which is delivered by the device D, and the stored data 24 from the body imprint, which is held in memory in the storage means 22,
for receiving said output signal P delivered by the first comparator means,
for comparing said data Id extracted from the captured image of the body imprint with said stored data 24 of the body imprint, while taking account of the positioning information for the body region in relation to the reference position thereof, which is supplied by the first comparator means 26, and
for delivering at S a signal representative of the comparison result, in particular a validation or and invalidation (for example a confirmation or a non-confirmation of identity, an access consent or refusal, . . . ).

A method for identifying an individual, which is capable of being implemented by means of the above first exemplary system arrangement, includes the steps consisting in:
optically capturing an image of a body imprint, in particular a fingerprint, from a region of the individual's body,
optically capturing, in parallel, an image of at least a portion of the venous network from said region of the individual's body and underlying said body imprint,
processing said body imprint image in order to obtain data extracted from this body imprint image, and
processing the data extracted from the captured image of the body imprint with the aid of the data extracted from the captured image of the venous network, with a view to identifying the individual,
Said method is then characterized in that:
during a preliminary registration (enrollment) step of an individual, a data pair, consisting of stored data extracted from the body imprint image and stored data extracted from the venous network image, is captured from a body region of each individual and stored in memory, the body region occupying a position which is taken as a reference position,
and then, subsequently during a step of identifying the individual,
a body imprint image and a venous network image are captured from the region of individual's body,
data extracted from the captured image of the venous network is first compared with the stored data from said venous network,
the actual position of the body region is deduced therefrom, in relation to the previously determined reference position, and
data extracted from the captured image of the body imprint is compared with the stored data from the body imprint, while taking account of the position of the body region in relation to the reference position thereof.

In a second exemplary arrangement, in addition to the role which was just stated and which is maintained, the data extracted from the venous network image can likewise optionally serve to improve, and in particular accelerate processing of the data extracted from the body imprint image, for the purposes of identifying an individual. In particular, the data extracted from the image of the venous network can be used to carry out rapid pre-sorting, this function being based on the fact that the comparison of characteristic data of the venous network image captured from the individual with that held in memory is simpler, and therefore faster than the comparison of characteristic data from the body imprint images.

To that end, FIG. 6 is a schematic representation, in the form of a block diagram, of a second exemplary arrangement of a system suitable for accelerating the process of identifying an individual by recording a body imprint of a body region thereof, in particular a fingerprint. This system comprises storage means 22 in which data pairs 23 are held in memory, which consist of stored data 24 extracted from a body imprint image of a body region and stored data 25 extracted from a venous network image of the body region of each individual of a group of individuals, which data is captured and stored during a preliminary registration (enrollment) step by using a device in accordance with the invention, as described previously, while, for each individual, the body region occupies a position which is taken as a reference position.

In order to subsequently enable identification of the individual, the system comprises a device for capturing a body imprint image of the region of the individual's body and a venous network image of the region of the individual's body, said device, which is designated by the reference sign D, being arranged in accordance with the invention, as described previously.

During a subsequent step for identifying an individual, third comparator means 28 are provided for, receiving captured data Iv extracted from the venous network image of the region of the individual's body, which are delivered by the device D, and successively the data 25 extracted from the stored images of the venous networks of the respective individuals of the group of individuals, which is held in memory in the storage means 22, comparing the captured data Iv extracted venous network image successively with said data 25 extracted from the stored images of the venous networks of the respective individuals of the group of individuals, and identifying the stored data 25' of the venous networks of the individuals of the group of individuals with is identical to the captured data Iv extracted from the venous network image of the individual. In order to simplify understanding of the invention and to facilitate reading of the diagram of FIG. 6, it is assumed that the stored data 25' extracted from the venous network images thus identified is selected and stored in temporary storage means 29; but this arrangement is not absolutely necessary and, in actual practice, arrangements may be made for the stored data extracted from the venous network images thus identified to simply be flagged in any way in the storage means 22.

Furthermore, the system is arranged as described previously with regard to FIG. 5.

To that end, first comparator means 26 are provided, for receiving the captured data Iv extracted from the venous network image of the individual, which is delivered by the device D, and each of the stored data 25' of selected venous networks in the temporary storage means 29, for comparing the captured data Iv extracted from the venous network image of the individual with each of the stored data 25' of venous networks, and for deducing therefrom the actual position (during apposition of the individual's body region 1 on the apposition region 4) of the region of the individual's body in relation to the previously determined and stored reference position (output signal P).

Finally, second comparator means 27 are provided in the system, for receiving the captured data Id extracted from the body imprint image of the individual, which is delivered by the device D, and each of the stored data 24' of the body imprint which are associated with the stored venous network data 25', for receiving the output signal P delivered by the first comparator means 26, for comparing the captured data Id extracted from the body imprint image of the individual with each of the stored data 24' of respective body imprints, while taking account each time of the positioning information for the region of the individual's body in relation to the reference position thereof, which is supplied by the first comparator means 26, and for delivering, at S, corrected data deduced from the data extracted from the captured image of the body imprint of the individual (e.g., the result may consist of an identifier found in a data base).

A method for identifying an individual, which is capable of being implemented by means of the above second exemplary system arrangement, includes the steps consisting in:

optically capturing an image of a body imprint, in particular a fingerprint, from a region of the individual's body, optically capturing, in parallel, an image of at least a portion of the venous network from said region of the individual's body and underlying said body imprint, processing said body imprint image in order to obtain data extracted from this body imprint image, and processing the data extracted from the captured image of the body imprint with the aid of the data extracted from the captured image of the venous network, with a view to identifying the individual.

This method is characterized in that:

during a preliminary registration (enrollment) step of a group of individuals, a data pair, consisting of stored data extracted from the body imprint image and stored data extracted from the venous network image, is captured from a body region of each individual and stored in memory, the body region occupying a position which is taken as a reference position, and then, subsequently during a step of identifying an individual, data extracted from the body imprint image and data extracted from the venous network image are captured from the individual's body region, the captured data of the individual's venous network is compared with the stored venous network data of the individuals of the group of individuals, for the stored venous network data is selected which is identical to said captured venous network data, and for the stored body imprint data which is paired with said stored venous network data that was selected, the captured venous network data is compared with the selected stored data of said venous network, and the actual position of the body region is deduced therefrom, in relation to the previously determined reference position, and the captured body imprint data is compared with the stored body imprint data associated with the selected stored data of said venous network, while taking account of the position of the body region in relation to the reference position thereof.

Finally, FIG. 7 is a schematic representation, in the form of a block diagram, of a third exemplary arrangement of a system, which comprises:

storage means 22 in which at least one data pair 23 is stored, which consists of stored data 24 extracted from the body imprint image of the region of the individual's body and stored data 25 extracted from the venous network image of the region of the individual's body, which data is captured during a preliminary registration (enrollment) step, while the body region occupies a position which is taken as a reference position, comparator means 26 capable of comparing data Iv extracted from the captured image of the venous network of the region of the individual's body, which is captured during a later step for identifying an individual, with the stored data 25 from said venous network, and of deducing therefrom the actual position of the body region in relation to the previously defined reference position, and correcting means 30 placed under the dependency (signal P) of said comparator means 26 and capable of correcting data Id extracted from the captured image of the body imprint of the region of the individual's body, which was captured during said later step, while taking account of the actual position of the body region in relation to the reference position thereof.

A method of identifying an individual, which is capable of being implemented by the above third exemplary system arrangement, includes the steps consisting in:

optically capturing an image of a body imprint, in particular a fingerprint, from a region of the individual's body, optically capturing, in parallel, an image of at least a portion of the venous network from said region of the individual's body and underlying said body imprint, processing said body imprint image in order to obtain data extracted from this body imprint image, and processing the data extracted from the captured image of the body imprint with the aid of the data extracted from the captured image of the venous network, with a view to identifying the individual.

This method is characterized in that:

during a preliminary registration (enrollment) step of an individual, a data pair, consisting of stored data extracted from the body imprint image and stored data extracted from the venous network image, is captured from a body region of each individual and stored in memory, the body region occupying a position which is taken as a reference position, and then, subsequently during a step of recording the body imprint of the individual, a body imprint image and a venous network image are captured from the region of the individual's body, data extracted from the captured image of the venous network is compared with the stored data from said venous network, the actual position of the body region is deduced therefrom, in relation to the previously determined reference position, and data extracted from the captured body imprint image is repositioned, while taking account of the actual position of the body region in relation to the reference position thereof.

After this, data extracted from the captured image of the body imprint of the individual is available, which, thus corrected in terms of position, can be used for various purposes for which the identification of the individual via the fingerprint thereof is only an intermediate step. In this case, only the final step can be made visible and/or displayed, e.g., such as a correspondence score, a decision (YES/NO), e.g., regarding access to a premises or to a device, an identifier in the case of a database search.

The invention claimed is:

1. A system for identifying an individual by recording a body imprint, in a region of the body of the individual, the system comprising means of optically capturing an image of a body imprint, from said region of the individual's body, means of optically capturing an image of at least a portion of the venous network in said region of the individual's body and underlying said body imprint, said system comprising two lighting means capable of emitting two light beams, respectively, containing two light radiations having two separate wavelengths, respectively, and sensing means capable of capturing said images in connection with said respective wavelengths, the system further comprising:

a prismatic optical element having a large face at least a portion of which consists of a region for apposition of a body region of an individual, first lighting means capable of emitting a first light radiation having a first wavelength and being arranged opposite a first inclined lateral face of said prismatic optical element, such that said first radiation emitted by said first lighting means passes through said prismatic optical element in order to arrive at said apposition region at an angle of incidence capable of total reflection, a first sensor sensitive to said first radiation being arranged opposite a second inclined lateral face of said prismatic optical element opposite said first inclined lateral face, so as to receive said first radiation reflected by said large face of said prismatic optical element and carrying an image of the body imprint when a region of an individual's body is applied to said apposition region, second lighting means capable of emitting a second light radiation having a second wavelength being arranged opposite a small face of the prismatic optical element such that said second radiation emitted by said second lighting means passes through said prismatic optical element in order to arrive at said apposition region, which is substantially perpendicular thereto and capable of penetrating into the region of the body when a region of an individual's body is applied to said apposition region, and said second sensor sensitive to said second radiation being arranged opposite said small face of said prismatic optical element so as to receive said second reflected radiation carrying an image of at least a portion of the underlying venous network, when a region of an individual's body is applied to said apposition region.

2. The system as claimed in claim 1, wherein said prismatic optical element is elongate such that said first light radiation undergoes multiple reflections prior to arriving at said second inclined lateral face.

3. The system as claimed in claim 1 wherein said means of optically capturing an image of said body imprint in a region of the individual's body and said means of optically capturing an image of at least a portion of the venous network in the region of the individual's body are controlled simultaneously.

4. The system as claimed in claim 1 wherein one wavelength is situated in the red for capturing the body imprint image, and the other wavelength is situated in the near-infrared for capturing the venous network.

5. The system as claimed in claim 1 further comprising:

storage means in which at least one data pair is stored in memory, which consists of stored data extracted from said body imprint image of the region of the individual's body and of stored data extracted from said image of the venous network of the region of the individual's body, which data is captured during a preliminary registration (or enrollment) step, while the body region occupies a position which is taken as a reference position, first comparator means capable of comparing data extracted from said captured image of the venous network of the region of the individual's body, which is captured during a later step for identifying an individual, with said stored data from said venous network, and of deducing therefrom the actual position of the body region in relation to the previously defined reference position, and second comparator means capable of comparing data extracted from said captured image of the body imprint of the region of the individual's body, which is captured during said later step for identifying the individual, with said data extracted from said stored image of the body imprint, said second comparator means being placed under the dependency of said first comparator means, in order to take account of the position of the body region in relation to the reference position thereof.

6. The system as claimed in claim 1 further comprising:
storage means in which data pairs are stored in memory, which consist of stored data extracted from a body imprint image of the region of the individual's body and of stored data extracted from an image of the venous network of the region of the body of each individual of a group of individuals, which data is captured and stored during a preliminary registration (or enrollment) step, while, for each individual, the body region occupies a position which is taken as a reference position,
third comparator means, which, during a later step for identifying an individual, are capable of comparing data extracted from said captured image of the venous network of the body region of an individual, which is captured during a later step for identifying the individual, with the data extracted from said stored images of venous networks of the group of individuals, and of identifying which stored data of venous network images of the group of individuals is identical with said captured data of individual's venous network image,
first comparator means, which, during said later step for identifying an individual, are capable of comparing said captured data of the individual's venous network image with each of said identified stored data of venous network images of the group of individuals, and, in each case, of deducing therefrom the actual position of the body region in relation to the previously determined reference position, and
second comparator means, which, during said later step for identifying an individual, are capable of comparing said captured data extracted from the individual's body imprint image with each of the stored data items of body imprints associated with said identified stored data of venous network images of the group of individuals, respectively, said second comparator means being placed under the dependency of said first comparator means in order to take account, in each case, of the position of the body region in relation to the reference position thereof.

7. The system as claimed in claim 1 further comprising:
storage means in which at least one data pair is stored in memory, which consists of stored data extracted from said body imprint image of the region of the individual's body and of stored data extracted from said image of the venous network of the region of the individual's body, which data is captured during a preliminary registration (or enrollment) step, while the body region occupies a position which is taken as a reference position,
comparator means capable of comparing data extracted from said captured image of the venous network of the region of the individual's body, which is captured during a later step for identifying an individual, with said stored data from said venous network, and of deducing therefrom the actual position of the body region in relation to the previously defined reference position, and
correcting means placed under the dependency of said comparator means and capable of correcting data extracted from said captured image of the body imprint of the region of the individual's body, which is captured during said later step, while taking account of the actual position of the body region in relation to the reference position thereof.

8. A method for identifying an individual, comprising:
optically capturing an image of a body imprint, from a region of the individual's body,
optically capturing, in parallel, an image of at least a portion of the venous network from said region of the individual's body and underlying said body imprint,
processing said body imprint image in order to obtain data extracted from said body imprint image, and
processing said data extracted from said captured image of the body imprint with the aid of data extracted from said captured image of the venous network, with a view to identifying the individual,
wherein
in that, during a preliminary registration (enrollment) step of an individual, a data pair, consisting of stored data extracted from said body imprint image and stored data extracted from said venous network image, is captured and stored in memory, the body region occupying a position which is taken as a reference position,
and then, subsequently during a step of identifying the individual,
a body imprint image and a venous network image are captured from the region of individual's body,
data extracted from said captured image of the venous network is first compared with said stored data from said venous network,
the actual position of the body region is deduced therefrom, in relation to the previously determined reference position, and
data extracted from said captured image of the body imprint is compared with said stored data from the body imprint, while taking account of the position of the body region in relation to the reference position thereof.

9. The method for identifying an individual, comprising:
optically capturing an image of a body imprint, from a region of the individual's body,
optically capturing, in parallel, an image of at least a portion of the venous network from said region of the individual's body and underlying said body imprint,
processing said body imprint image in order to obtain data extracted from said body imprint image, and
processing said data extracted from said captured image of the body imprint with the aid of said data extracted from said captured image of the venous network, with a view to identifying the individual,
wherein
during a preliminary registration (enrollment) step for a group of individuals, a data pair, consisting of stored data extracted from said body imprint image and stored data extracted from said venous network image, is captured from a body region of each individual and stored in memory,
and then, subsequently during a step of identifying an individual,
data extracted from said body imprint image and data extracted from said venous network image is captured from the region of the individual's body,
said data captured from the venous network of the individual is compared with the stored data from venous networks of the individuals of the group of individuals,
said stored venous network data which is identical to said captured venous network data is selected, and
for said stored body imprint data which is paired with said stored venous network data that was selected, said captured venous network data is compared with said selected stored data of said venous network, and the actual position of the body region is deduced therefrom in relation to the previously determined reference position, and said captured body imprint data is compared with the stored body imprint data associated with said selected stored data of said venous network, while taking account of the position of the body region in relation to the reference position thereof.

10. The method for identifying an individual comprising:
optically capturing an image of a body imprint, from a region of the individual's body,
optically capturing, in parallel, an image of at least a portion of the venous network from said region of the individual's body and underlying said body imprint,
processing said body imprint image in order to obtain data extracted from this body imprint image, and
processing said data extracted from said captured image of the body imprint with the aid of the data extracted from the captured image of the venous network, with a view to identifying the individual,
wherein
during a preliminary registration (enrollment) step of an individual, a data pair, consisting of stored data extracted from said body imprint image and stored data extracted from said venous network image, is captured from a body region of each individual and stored in memory, the body region occupying a position which is taken as a reference position,
and then, subsequently during a step of recording the body imprint of the individual,
a body imprint image and a venous network image are captured from the region of individual's body,
data extracted from said captured image of the venous network is compared with said stored data from said venous network,
the actual position of the body region is deduced therefrom, in relation to the previously determined reference position, and
data extracted from the said captured body imprint image is repositioned, while taking account of the actual position of the body region in relation to the reference position thereof.

11. The method as claimed in claim 8, wherein said body imprint image and said venous network image are captured simultaneously.

12. The method as claimed in claim 8 wherein the body region is illuminated with two light radiations having two separate wavelengths, and said images are captured in connection with the respective wavelengths.

13. The method of claim 12, wherein, to capture said body imprint image, the body region is illuminated with radiation having a wavelength situated in the red and, to capture said venous network, the body region is illuminated with radiation having a wavelength situated in the near-infrared.

* * * * *